United States Patent
Jiang

(10) Patent No.: US 11,462,787 B2
(45) Date of Patent: Oct. 4, 2022

(54) ELECTRODE ASSEMBLY PACKAGE STRUCTURE

(71) Applicant: Ningde Amperex Technology Limited, Fujian (CN)

(72) Inventor: Jing Jiang, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 0 days.

(21) Appl. No.: 16/133,925

(22) Filed: Sep. 18, 2018

(65) Prior Publication Data
US 2019/0296271 A1   Sep. 26, 2019

Related U.S. Application Data

(63) Continuation of application No. PCT/CN2018/079862, filed on Mar. 21, 2018.

(51) Int. Cl.
*H01M 50/116* (2021.01)
*H01M 50/172* (2021.01)
*H01M 50/183* (2021.01)

(52) U.S. Cl.
CPC ....... *H01M 50/116* (2021.01); *H01M 50/172* (2021.01); *H01M 50/183* (2021.01)

(58) Field of Classification Search
CPC ............. H01M 50/102; H01M 50/105; H01M 50/183; H01M 50/116; H01M 50/172
See application file for complete search history.

(56) References Cited

U.S. PATENT DOCUMENTS 6,482,544 B1 * 11/2002 Shiota ................. H01M 50/116
429/185
2015/0364729 A1 * 12/2015 Jang ..................... H01M 50/116
429/185
2016/0093837 A1   3/2016 Bushnell et al.
(Continued)

FOREIGN PATENT DOCUMENTS

CN      1610166 A      4/2005
CN    203800091 U  *  8/2014
CN    203800091 U      8/2014
(Continued)

OTHER PUBLICATIONS

Machine translation JP-2007200589-A (Year: 2007).*
(Continued)

*Primary Examiner* — Milton I Cano
*Assistant Examiner* — Mary G Henshaw
(74) *Attorney, Agent, or Firm* — Morgan, Lewis & Bockius LLP

(57) ABSTRACT

Embodiments of the present application provide an electrode assembly package structure, comprising a package side and a sealing side extending along the length of the electrode assembly package structure, wherein the sealing side includes a first sealing segment that abuts the package side and a second sealing segment that is between the package side and the first sealing segment. The purpose of the present application is to provide an electrode assembly package structure capable of reducing the influence of the sealing side on the length of the package structure and improving the space utilization in the length direction.

7 Claims, 7 Drawing Sheets

(56) References Cited

U.S. PATENT DOCUMENTS

2019/0386330 A1* 12/2019 Choi .................. H01M 10/045
2020/0365836 A1* 11/2020 Jung .................. H01M 50/543

FOREIGN PATENT DOCUMENTS

| | | | |
|---|---|---|---|
| CN | 105280955 A | | 1/2016 |
| CN | 206250224 U | | 6/2017 |
| CN | 206422169 U | | 8/2017 |
| EP | 1524709 A2 | | 4/2005 |
| JP | 2001-118547 | | 4/2001 |
| JP | 2002-260602 | | 9/2002 |
| JP | 2002-319375 | | 10/2002 |
| JP | 2005-123158 | | 5/2005 |
| JP | 2007200589 A | * | 8/2007 |
| JP | 2007200589 A | | 8/2007 |
| KR | 20040054113 A | * | 6/2004 |
| KR | 20040054113 A | | 6/2004 |
| KR | 20180115064 A | | 10/2018 |

OTHER PUBLICATIONS

Machine translation of CN-203800091-U (Year: 2014).*
Machine translation of KR-20040054113-A (Year: 2004).*
Ningde Amperex Technology Limited, International Search Report and Written Opinion, PCT/CN2018/079862, dated Nov. 8, 2018, 12 pgs.
Ningde Amperex Technology Limited, Extended European Search Report, EP18910872.3, dated Jan. 18, 2021, 7 pgs.
Ningde Amperex Technology Limited, Examination Report, IN202017012627, dated Feb. 25, 2021, 6 pgs.
Office Action, JP2020-517333, dated May 18, 2021, 2 pgs.
Ningde New Energy Technology Co., Ltd., Second Office Action, CN201880054106.6, dated Jan. 6, 2022, 14 pgs.
Office Action, CN201880054106.6, dated Oct. 27, 2021, 8 pgs.
Office Action, KR10-2020-7008568, dated Aug. 17, 2021, 6 pgs.

* cited by examiner

ELECTRODE ASSEMBLY PACKAGE STRUCTURE

CROSS-REFERENCE TO RELATED APPLICATIONS

The present application is a continuation-application of PCT Patent Application No. PCT/CN2018/079862 filed on Mar. 21, 2018, the entire contents of which are hereby incorporated by reference.

FIELD OF THE INVENTION

The present application relates to the field of battery package, in particular, to an electrode assembly package structure.

BACKGROUND OF THE INVENTION

With the commercialization of lithium ion battery, the market demand for energy density is getting higher and higher. There are still some problems with the package structure when packaging the electrode assembly. At present, the electrode assembly package generally adopts a sealing side hem method, which can greatly eliminate the influence of the sealing side on the energy density. However, when the electrode assembly is pumped and packaged, a part of the length of the package bag is converted into thickness, so that the length of the body is shorter than the length of the side portion, that is, there is a large sealing side extension portion, which accounts for the total length of the electrode assembly.

SUMMARY OF THE INVENTION

For the problems in the related art, the purpose of the present application is to provide an electrode assembly package structure capable of reducing the influence of the sealing side on the length of the package structure and improving the space utilization in the length direction.

According to embodiments of the present application, an electrode assembly package structure is provided comprising a package side and a sealing side extending along a length of the electrode assembly package structure, wherein the sealing side includes a first sealing segment that abuts the package side and a second sealing segment that is between the package side and the first sealing segment.

According to embodiments of the present application, the second sealing segment is formed by folding a portion of the sealing side extending beyond an end of the electrode assembly package structure along the length direction.

According to embodiments of the present application, the electrode assembly includes an electrode tab, and the first sealing segment includes a top edge and a bottom edge at both ends of the electrode assembly along the length direction, and the bottom edge is away from the electrode tab, wherein the second sealing segment is formed at the bottom edge.

According to embodiments of the present application, an outer surface of the sealing side is affixed with an adhesive tape or coated with glue.

According to embodiments of the present application, the sealing side is folded along a fold line to form the second sealing segment, and each segment of the fold line is in a straight line.

According to embodiments of the present application, the fold line is a bent line.

According to embodiments of the present application, the fold line is perpendicular to an outer edge of the sealing side.

According to embodiments of the present application, in the length direction of the electrode assembly package structure, the length of the second sealing segment beyond the electrode assembly is less than or equal to 0.3 mm.

According to embodiments of the present application, in a thickness direction of the electrode assembly package structure, a height of the second sealing segment is less than or equal to the thickness of the electrode assembly package structure.

According to embodiments of the present application, it comprises a top seal extending along a width direction of the electrode assembly package structure and a beveled edge joined to the top seal and the sealing side, the beveled edge is located between the first sealing segment and the package side.

The beneficial technical effects of the present application are as follows:

In the electrode assembly package structure, the second sealing segment in the sealing side extending along the length of the electrode assembly package structure (i.e., sealing side extension portion) is sandwiched between the package side and the first sealing segment, so that the extension portion does not occupy the length of the package structure, thereby reducing the influence of the sealing side on the length of the package structure and increasing the space utilization in the length direction. Moreover, this structure has a significant effect on the drop of the electrode assembly, and can also avoid the influence of the package on the extrusion deformation of the anode, and improve the package optimization rate.

DETAILED DESCRIPTION OF THE PREFERRED EMBODIMENTS

The present application will now be described with reference to the accompanying drawings. It is to be understood that the various embodiments shown in the following figures and the examples described below are exemplary embodiments of the present application and are not intended to limit the present invention. Various embodiments may be combined with one another to form other examples not shown in the figures.

Figure 1:
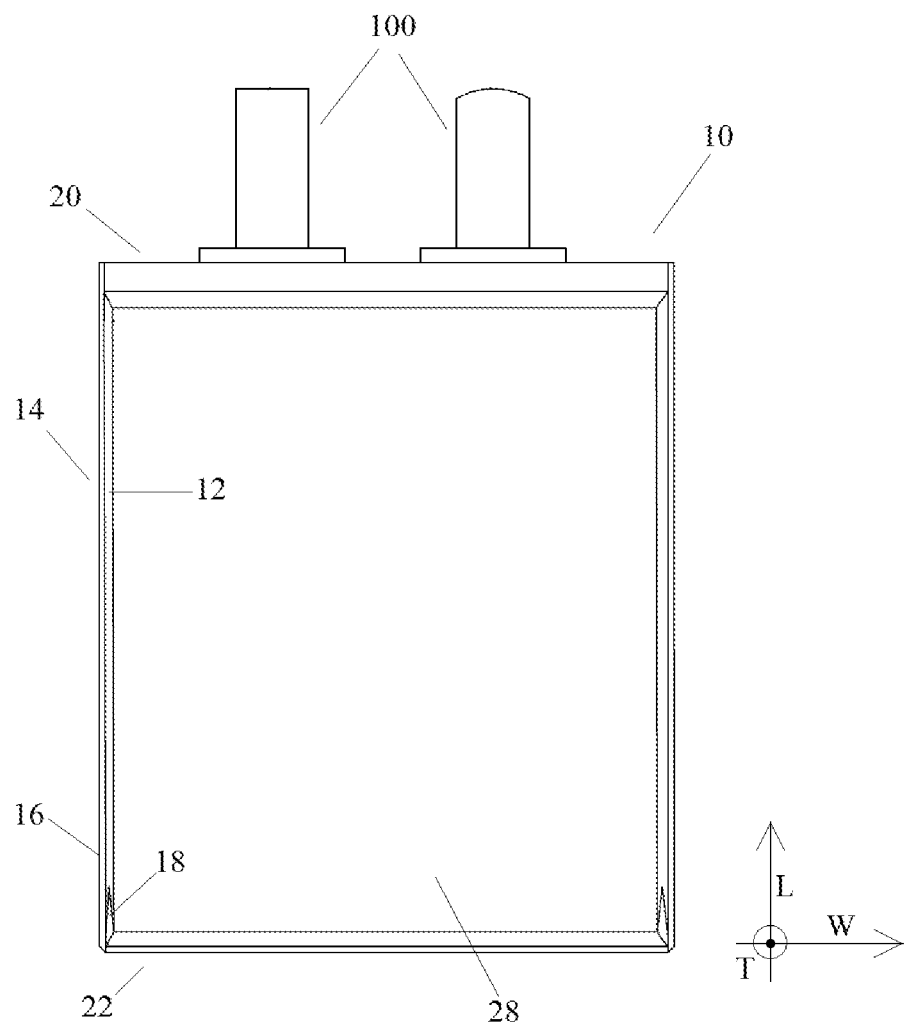
FIG. 1 is a schematic view of the electrode assembly package structure according to an embodiment of the present application.

According to an embodiment of the present application, as shown in FIG. 1, the present application provides an electrode assembly package structure 10. Generally, the electrode assembly package structure 10 comprises a package side 12 and a sealing side 14 extending along the length direction L of the electrode assembly package structure 10.

Specifically, with reference to the embodiment shown in FIG. 1, the sealing side 14 includes a first sealing segment 16 and a second sealing segment 18. Among them, the first sealing segment 16 abuts the package side 12, and the second sealing segment 18 is located between the package side 12 and the first sealing segment 16.

In an embodiment of the present application, the second sealing segment 18 may be formed by folding a portion of the sealing side 14 extending beyond an end of the electrode assembly package structure 10 along the length direction L.

Figure 2:
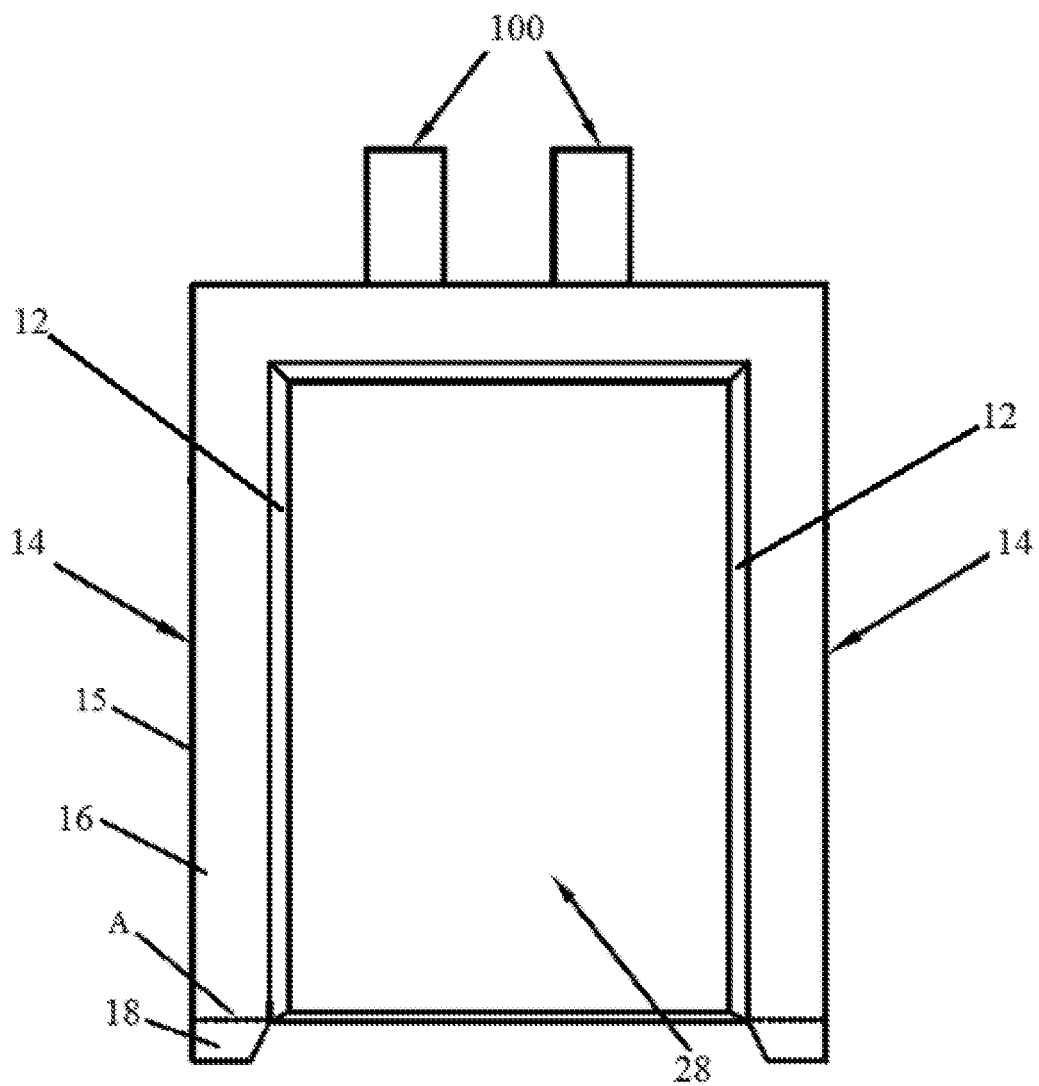
FIGS. 2 and 3 is a schematic view showing an intermediate stage of forming the structure of FIG. 1 according to an embodiment of the present application.
Figure 3:
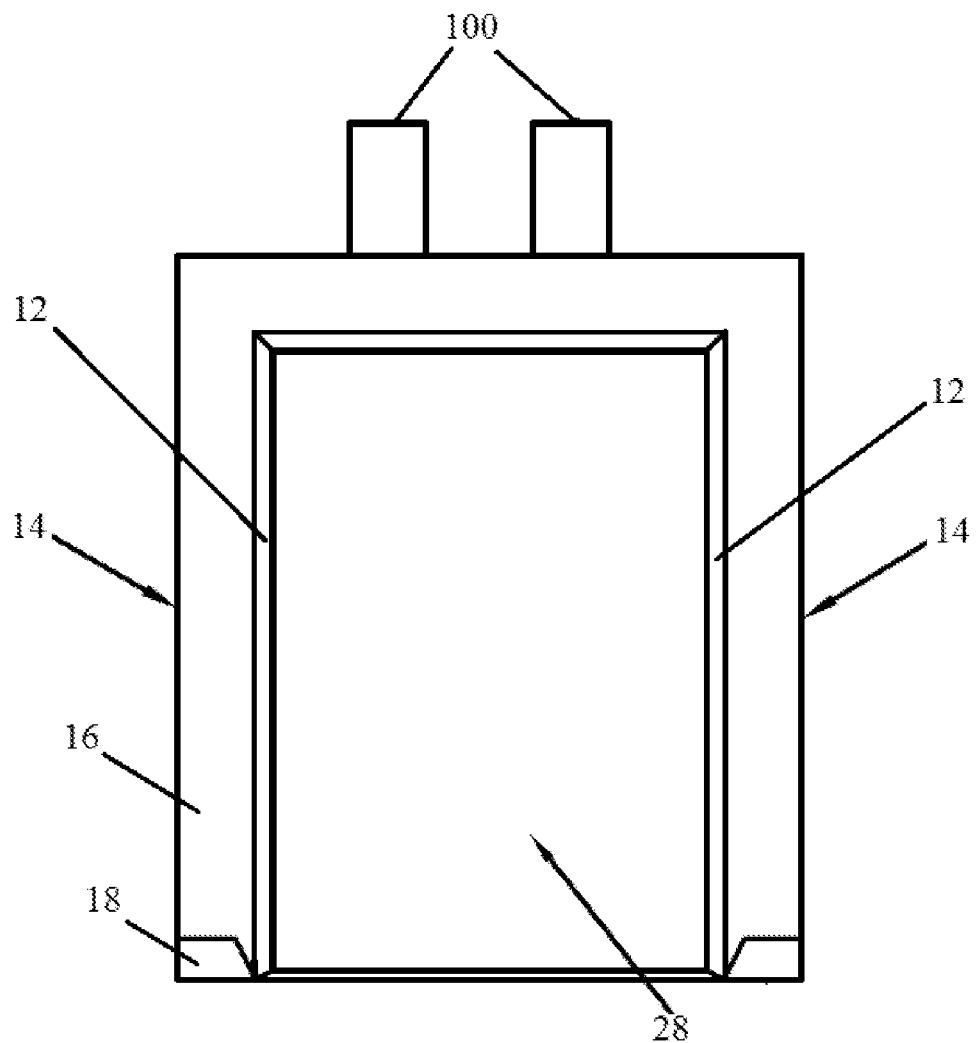

Specifically, the operation as described above will be described with reference to FIGS. 2 and 3. As shown in FIG. 2, the second sealing segment 18 may be a portion of the first sealing segment 16 that extends beyond the end (e.g., the bottom end) of the electrode assembly package structure 10 that is created during electrode assembly package. Then, the second sealing segment 18 is folded along the length direction L so as to be stacked on the first sealing segment 16, as shown in FIG. 3. Further, the first sealing segment 16 stacked with the second sealing segment 18 is folded in the width direction W of the package structure 10 to be attached to the package side 12, and the second sealing segment 18 is sandwiched between the first sealing segments 16 and the package side 12.

In the embodiment shown in FIG. 2, the sealing side 14 may be folded along the fold line A to form the second sealing segment 18. Among them, the fold line A is perpendicular to the outer edge 15 of the sealing side 14. That is to say, in the embodiment shown in FIG. 2, the fold line A is a horizontal line; the fold line may also include other various alternative embodiments, which will be described in detail below.

By the way as described above, the second sealing segment 18 in the sealing side 14 extending along the length direction L of the electrode assembly package structure 10 (i.e., sealing side extension portion of the sealing side 14) is sandwiched between the package side 12 and the first sealing segment 16, so that the extension portion does not occupy the length of the package structure 10, thereby reducing the influence of the sealing side 14 on the length of the package structure 10 and increasing the space utilization in the length direction. Moreover, this structure has a significant effect on the drop of the electrode assembly, and can also avoid the influence of the package on the extrusion deformation of the anode, and improve the package optimization rate.

With continued reference to FIG. 1, in an embodiment of the present application, the electrode assembly 28 includes an electrode tab 100, and the first sealing segment 16 of the sealing side 14 includes a top edge 20 and a bottom edge 22 that are at opposite ends of the electrode assembly 28 along the length direction L. As shown, the bottom edge 22 is away from the electrode tab 100; correspondingly, the electrode tab 100 is arranged on the top edge 20 and the second sealing segment 18 is formed on the bottom edge 22. That is, when the package is completed, the electrode tab 100 on the top of the electrode assembly 28 may be exposed by the top of the package structure 10, and the second sealing segment 18 in the present application is located at the bottom of the sealing side 14, i.e., a portion away from the electrode tab 100. That is, the top edge 20 of the first sealing segment 16 is closer to the electrode tab 100 of the electrode assembly 28 than the bottom edge 22.

In an alternative embodiment of the present application, the outer surface of the sealing side 14 may be affixed with an adhesive tape or coated with glue to insulate the sealing side 14.

In an alternative embodiment of the present application, the electrode assembly package structure 10 of the present application may further include a body portion formed with an electrode assembly accommodating groove, and the body portion may include a first body portion and a second body portion that are stacked on each other. Among them, the electrode assembly 28 to be packaged may be accommodated in the electrode assembly accommodating groove, and then the first body portion and the second body portion are folded into each other to form an integral package structure for packaging the electrode assembly.

Alternatively, for the main body portion, it may adopt a "single-pit" or "double-pit" structure. For example, for a single-pit structure, the electrode assembly accommodating groove accommodating the electrode assembly may be completely formed on the first body portion, in which case the thickness of the electrode assembly accommodating groove is equal to the thickness of the electrode assembly to be packaged. For the double-pit structure, the electrode assembly accommodating groove may include a first portion and a second portion respectively formed on the first body portion and the second body portion, and when the first portion and the second portion are folded over, the electrode assembly may be packaged therebetween. That is, the sum of the thicknesses of the first portion and the second portion at this time is equal to the thickness of the electrode assembly to be packaged. It should be understood that the structures of the main body portions of the respective embodiments as described above may be applied to the present application and may be determined according to specific use cases, and the present application is not limited thereto.

Figure 4A:
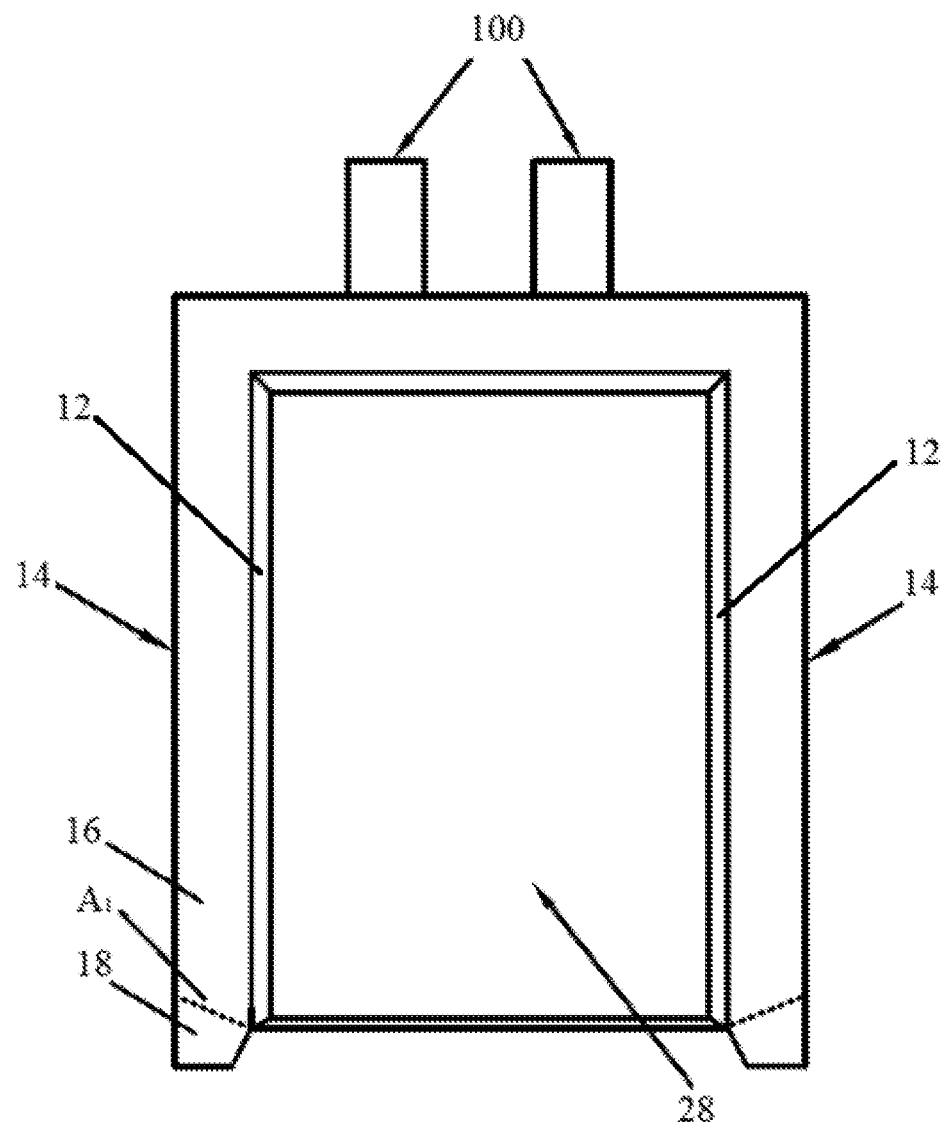
FIGS. 4A to 4C is schematic view of an alternative embodiment of the present application.

Alternative embodiments of the present application are described below with reference to FIGS. 4A-4C. As shown in FIG. 4A, in an alternative embodiment, the sealing side 14 may be folded along the fold line A1 to form the second sealing segment 18, and each segment of the fold line A1 is in a straight line. In other words, in the embodiment shown in FIG. 4A, the fold line A1 is a continuous straight line.

Figure 4B:
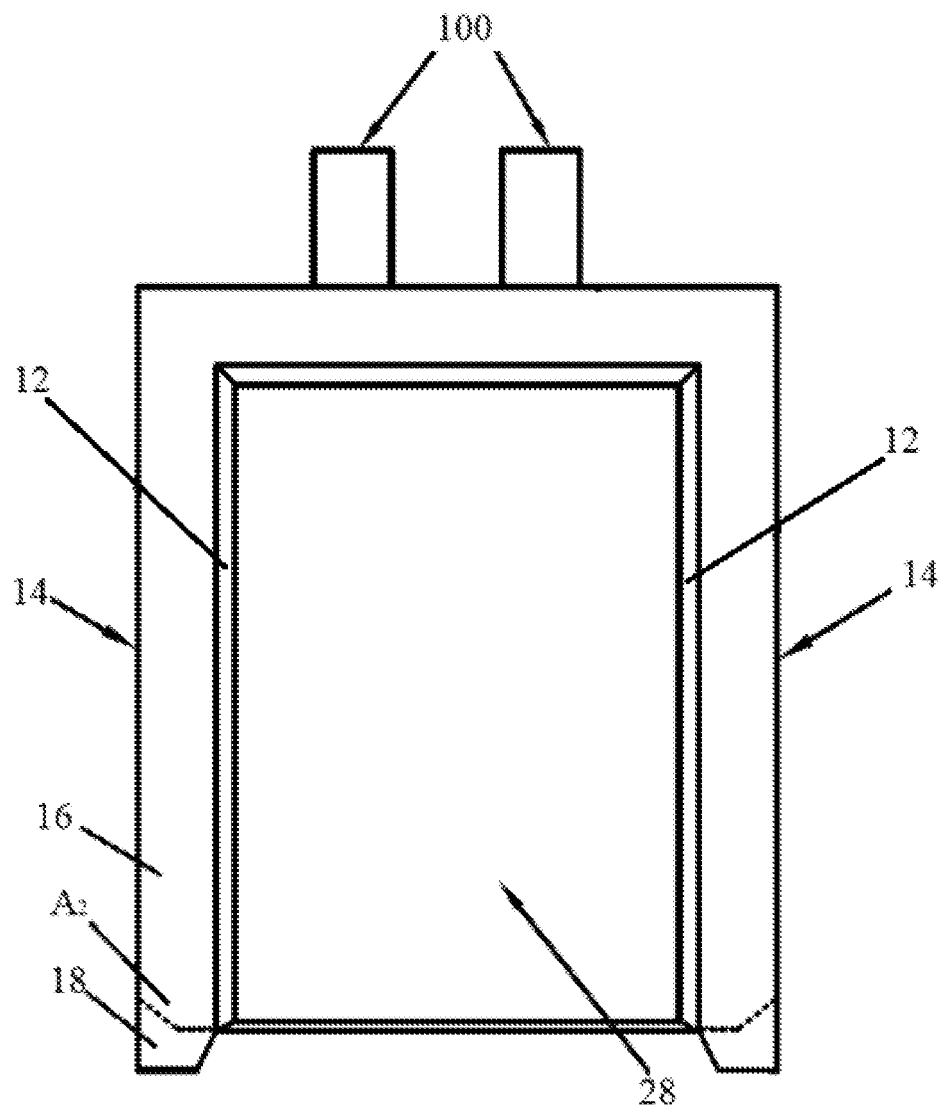
Figure 4C:
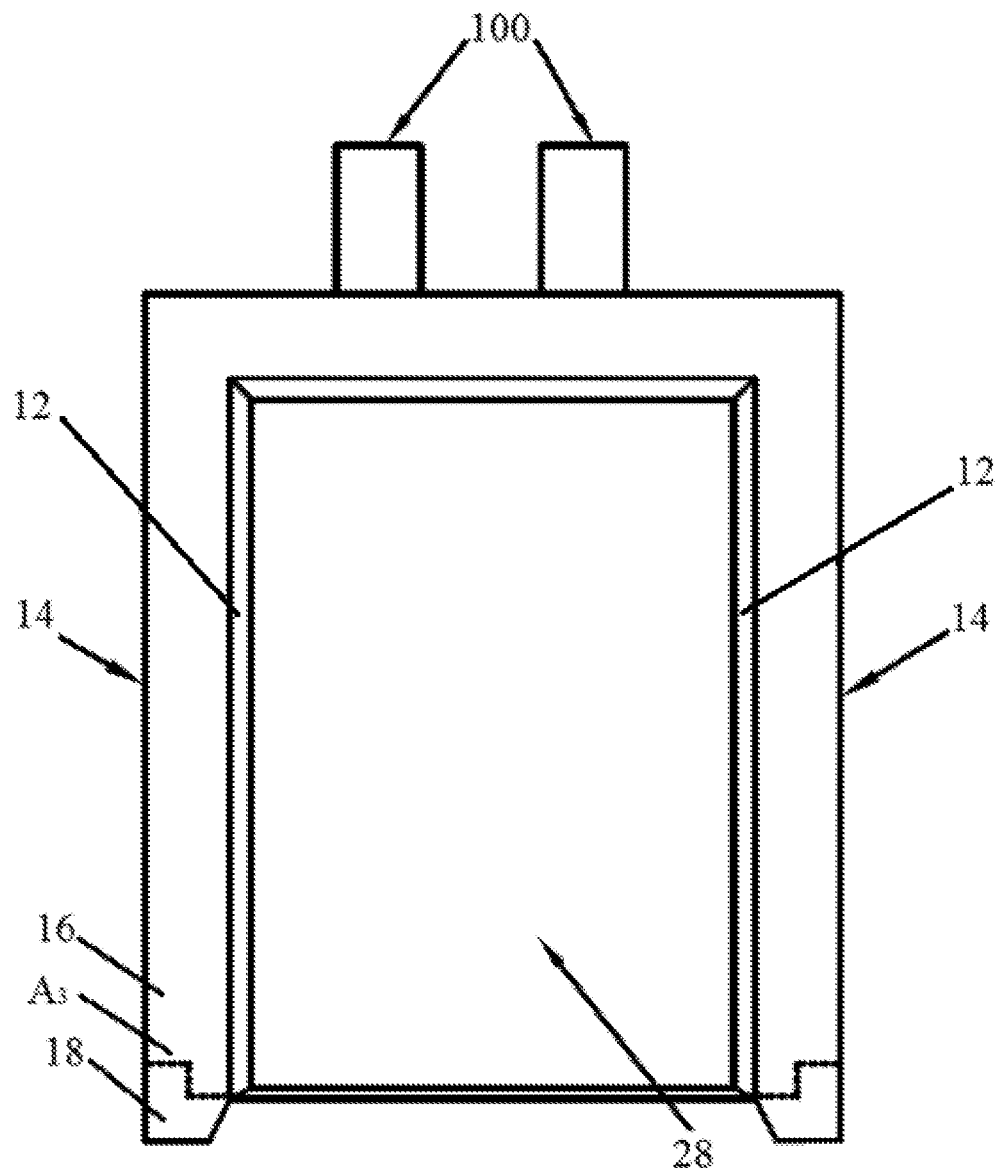

Unlike the embodiment shown in FIG. 4A, the fold lines in the form of two bent lines are shown in the embodiments shown in FIGS. 4B and 4C. In the embodiment shown in FIG. 4B, the fold line A2 is a bent line and includes two portions that are at an angle to each other; and in the embodiment shown in FIG. 4C, the fold line A3 is also a fold line, but includes three consecutive portions. It should be understood that each embodiment shown in FIGS. 4A to 4C may be applied to the package structure 10 of the present application and may be determined according to specific use cases, and the present application is not limited thereto.

In combination with the embodiments described above, during the actual operation of the present application, the portion of the sealing side 14 extending beyond the package structure 10 may be pre-cut (e.g., cut to various shapes as shown in FIGS. 4A-4C), so that the sealing segments may be eliminated more completely and the insulation treatment for the sealing side 14 is facilitated (i.e., there is no excess fold area at the bottom of the package structure 10 at this time). It should be understood, of course, that the above description is merely an alternative embodiment of the present application and does not constitute any limitation to the present application.

In addition, in alternative embodiments of the present application, in the length direction L of the electrode assembly package structure 10, the length of the second sealing segment 18 beyond the body of the electrode assembly 28 is less than or equal to 0.3 mm. Moreover, in the thickness direction T of the electrode assembly package structure 10, the height of the second sealing segment 18 is less than or equal to the thickness of the electrode assembly package structure 10. In other words, the formed second sealing segment 18 should not extend beyond the electrode assembly package structure 10 in the thickness direction of the electrode assembly package structure 10.

Figure 5:
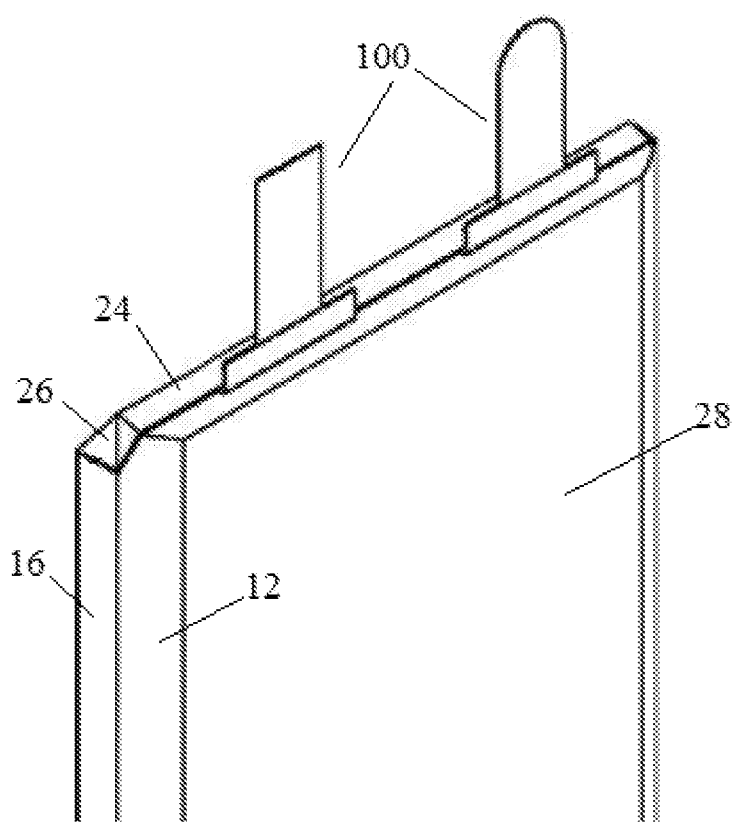
FIG. 5 is a partial enlarged view of the electrode assembly package structure according to an embodiment of the present application.

With continued reference to the drawings, in the embodiment shown in FIG. 5, the electrode assembly package structure 10 may further comprise a top seal 24 extending in the width direction W of the electrode assembly package structure 10, and a beveled edge 26 joined to the top seal 24 and the sealing side 14. Similar to the second sealing segment 18 above, the beveled edge is also located between the first sealing segment 16 and the package side 12. Thus, the above arrangement may also not allow the beveled edge 26 forming the extension portion of the package structure 10 to occupy the length of the package structure 10 at the top of the electrode assembly package structure 10, thereby reducing the effect of the sealing side 14 on the length of the package structure 10 and increasing the space utilization in the length direction.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A package structure of electrode assembly comprising a body portion forming a groove accommodating an electrode assembly and two sealing sides, and each sealing side is connected to the body portion and extends along a length direction of the electrode assembly, wherein each sealing side includes a first sealing segment and a second sealing segment, a part of the first sealing segment abuts a side of the body portion, and a part of the second sealing segment extending beyond a bottom of the body portion along the length of the electrode assembly is folded along a fold line towards a top of the electrode assembly to be sandwiched between the side of the body portion and another part of the first sealing segment; and the fold line is a polyline comprising a first line segment extending from the body portion along a first direction extending along the bottom of the body portion and having a distal end away from the body portion and a second line segment connected to the distal end of the first line segment and extending further away from the body portion along a second direction different from the first direction.

2. The package structure of electrode assembly according to claim 1, wherein the electrode assembly includes an electrode tab, and the first sealing segment includes a top edge and a bottom edge at both ends of the electrode assembly along the length direction, and the bottom edge is away from the electrode tab, wherein the second sealing segment is formed at the bottom edge.

3. The package structure of electrode assembly according to claim 1, wherein an outer surface of each sealing side is affixed with an adhesive tape or coated with glue.

4. The package structure of electrode assembly according to claim 1, wherein the first line segment of the fold line is perpendicular to an outer edge of the sealing side.

5. The package structure of electrode assembly according to claim 1, wherein in the length direction of the of electrode assembly, a length of the second sealing segment beyond the electrode assembly is less than or equal to 0.3 mm.

6. The package structure of electrode assembly according to claim 1, wherein in a thickness direction of the of electrode assembly, a height of the second sealing segment is less than or equal to a thickness of the package structure of electrode assembly.

7. The package structure of electrode assembly according to claim 1, further comprising a top seal extending along a width direction of the electrode assembly package structure and a beveled edge joined to the top seal and the sealing side, the beveled edge is located between the first sealing segment and the side of the electrode assembly.

* * * * *